US012064863B1

(12) United States Patent
Tsai

(10) Patent No.: US 12,064,863 B1
(45) Date of Patent: Aug. 20, 2024

(54) TOOL BOX STRUCTURE

(71) Applicant: Chang-Yu Tsai, Taichung (TW)

(72) Inventor: Chang-Yu Tsai, Taichung (TW)

( * ) Notice: Subject to any disclaimer, the term of this patent is extended or adjusted under 35 U.S.C. 154(b) by 0 days.

(21) Appl. No.: 18/446,737

(22) Filed: Aug. 9, 2023

(51) Int. Cl.
*B25H 3/02* (2006.01)

(52) U.S. Cl.
CPC .................................... *B25H 3/021* (2013.01)

(58) Field of Classification Search
CPC ...... B25H 3/021; B25H 3/02; B65D 21/0228; B65D 21/0212; B65D 21/00224; B65D 21/0222
USPC .......................................................... 206/506
See application file for complete search history.

(56) References Cited

U.S. PATENT DOCUMENTS 6,874,634 B2 * 4/2005 Riley .................... A61B 50/30 206/439
6,889,838 B2 * 5/2005 Meier .................... B25H 3/026 206/508
7,334,680 B2 * 2/2008 Cunningham ......... B25H 3/023 220/729
7,367,571 B1 * 5/2008 Nichols ..................... B62B 1/12 280/47.131
7,472,730 B2 * 1/2009 Adkins ................... B25B 5/068 144/287
7,503,569 B2 * 3/2009 Duvigneau .............. B25H 3/00 190/110
7,523,827 B2 * 4/2009 Dane ......................... A61L 2/26 206/508
7,748,529 B2 * 7/2010 Foreman ................ A61B 50/34 220/23.88
8,046,961 B1 * 11/2011 Cutting ................... H02S 10/40 52/173.3
8,210,387 B2 * 7/2012 Twig ...................... B25H 3/022 220/521
8,602,217 B2 * 12/2013 Sosnovsky ......... B65D 21/0228 220/756
8,657,307 B2 * 2/2014 Lifshitz .................... B25H 3/02 280/47.17
8,813,960 B2 * 8/2014 Fjelland ................ F16B 45/036 220/4.27
9,132,543 B2 * 9/2015 Bar-Erez ................... B62B 1/04
9,187,210 B2 * 11/2015 Zhu ......................... E05C 19/14
9,415,504 B2 * 8/2016 Chen ........................ B25H 3/02
9,616,562 B2 * 4/2017 Hoppe ................. A45C 7/0086
RE47,022 E * 9/2018 Sosnovsky ............. B65D 45/22
D844,324 S * 4/2019 Hoppe .......................... D3/905
(Continued)

*Primary Examiner* — Ernesto A Grano
(74) *Attorney, Agent, or Firm* — Chun-Ming Shih; LANWAY IPR SERVICES

(57) ABSTRACT

A tool box structure includes multiple tool boxes. Each of the tool boxes includes a first case, a second case, a first restriction unit, and a second restriction unit. The first case is provided with a receiving space, multiple first mounting portions, a first locking portion, a first inclined face, two second mounting portions, and a limit portion. The second case is provided with multiple third mounting portions, a second locking portion, a second inclined face, two fourth mounting portions, a first receiving groove, a second receiving groove, and a third receiving groove. The first restriction unit is mounted in the first receiving groove and moved in the first receiving groove to restrict or release the limit portion. The second restriction unit is mounted in the second receiving groove. The second restriction unit is assembled with the first restriction unit.

10 Claims, 9 Drawing Sheets

(56) References Cited

U.S. PATENT DOCUMENTS

| | | | | | |
|---|---|---|---|---|---|
| 10,575,417 | B2 * | 2/2020 | Sabbag | H05K 5/0204 | |
| 10,583,962 | B2 * | 3/2020 | Brunner | A45F 3/10 | |
| 10,750,833 | B2 * | 8/2020 | Burchia | B65D 21/0223 | |
| D904,829 | S * | 12/2020 | Nichols | D7/605 | |
| D907,445 | S * | 1/2021 | Nichols | D7/605 | |
| 11,059,631 | B1 * | 7/2021 | Brunner | B65D 21/0217 | |
| 11,072,461 | B2 * | 7/2021 | Gonitianer | B65D 21/0228 | |
| 11,203,465 | B2 * | 12/2021 | Seiders | B65D 43/22 | |
| 11,230,410 | B2 * | 1/2022 | Brunner | B25H 3/02 | |
| 11,279,518 | B2 * | 3/2022 | Kögel | B25H 3/02 | |
| D960,648 | S * | 8/2022 | Bullock | D7/553.2 | |
| 11,426,859 | B2 * | 8/2022 | Squiers | A45F 3/047 | |
| 11,485,542 | B2 * | 11/2022 | Brunner | B25H 3/02 | |
| D985,937 | S * | 5/2023 | Bullock | D3/276 | |
| 11,780,075 | B2 * | 10/2023 | Barton | A45C 13/02 | 206/372 |
| 11,840,269 | B2 * | 12/2023 | Brunner | B62B 1/002 | |
| 11,912,477 | B2 * | 2/2024 | Miller | A45C 5/04 | |
| 11,919,145 | B2 * | 3/2024 | Karlsson | B62B 1/12 | |
| D1,022,612 | S * | 4/2024 | Zhou | D7/703 | |
| 11,965,541 | B2 * | 4/2024 | Baruch | F16B 5/0635 | |
| 11,976,498 | B2 * | 5/2024 | Seiders | E05B 17/2057 | |
| 11,986,946 | B2 * | 5/2024 | Zhang | B25H 3/02 | |
| 2010/0108549 | A1 * | 5/2010 | Eggers | B25H 3/028 | 206/349 |
| 2010/0224527 | A1 * | 9/2010 | Huang | B25H 3/028 | 206/503 |
| 2010/0290877 | A1 * | 11/2010 | Landau | B25H 3/028 | 414/490 |
| 2011/0049824 | A1 * | 3/2011 | Bar-Erez | B25H 3/028 | 280/47.26 |
| 2011/0073516 | A1 * | 3/2011 | Zelinskiy | B25H 3/02 | 206/509 |
| 2015/0274362 | A1 * | 10/2015 | Christopher | B65D 21/0219 | 206/506 |
| 2016/0144500 | A1 * | 5/2016 | Chen | B65D 21/023 | 206/349 |
| 2018/0044059 | A1 * | 2/2018 | Brunner | B25H 3/02 | |
| 2018/0161975 | A1 * | 6/2018 | Brunner | A45C 5/14 | |

* cited by examiner

TOOL BOX STRUCTURE

BACKGROUND OF THE INVENTION

Field of the Invention

The present invention relates to a tool box structure.

Description of the Related Art

A conventional tool box assembly was disclosed in the applicant's U.S. Pat. No. 10,434,638, and comprises multiple tool boxes 1. Each of the tool boxes 1 includes a body 10, a cover 20, and two connectors 30.

However, the conventional tool box assembly has the following disadvantages.

1. Referring to FIG. 7, the tool boxes 1 are stacked. When the connectors 30 of one of the tool boxes 1 are snapped onto the blocks 13, the connectors 30 also restrict the insertion plates 14 of another one of the tool boxes 1 to prevent the insertion plates 14 from being detached from the notches 24. The connectors 30 only slide leftward or rightward.

2. The insertion plates 14 are received in the notches 24, the engaging portion 15 is received in the room 25, and the hook 16 is locked in the slot 26. Each of the tool boxes 1 only has three locking positions.

3. The hook 16 and the inclined face 17 are located at the same side of each of the tool boxes 1. When the engaging portion 15 is received in the room 25, the engaging portion 15 cannot be detached from the room 25 smoothly.

BRIEF SUMMARY OF THE INVENTION

In accordance with the present invention, there is provided a tool box structure comprising multiple tool boxes. Each of the tool boxes includes a first case, a second case, a first restriction unit, and a second restriction unit. The first case has an interior provided with a receiving space. The first case is provided with multiple first mounting portions, a first locking portion, a first inclined face, two second mounting portions, and a limit portion. The second case is provided with multiple third mounting portions, a second locking portion, a second inclined face, and two fourth mounting portions. The second case is provided with a first receiving groove, a second receiving groove, and a third receiving groove. The first restriction unit is mounted in the first receiving groove. The first restriction unit is moved in the first receiving groove to restrict or release the limit portion. The second restriction unit is mounted in the second receiving groove. The second restriction unit is assembled with the first restriction unit.

According to the primary advantages of the present invention, the limit portion of the first case of one of the tool boxes is received and limited in the third receiving groove of the second case of another one of the tool boxes. The first restriction unit and the second restriction unit are limited in the first receiving groove and the second receiving groove respectively. Thus, the second restriction unit drives the first restriction unit to lock or unlock the limit portion.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
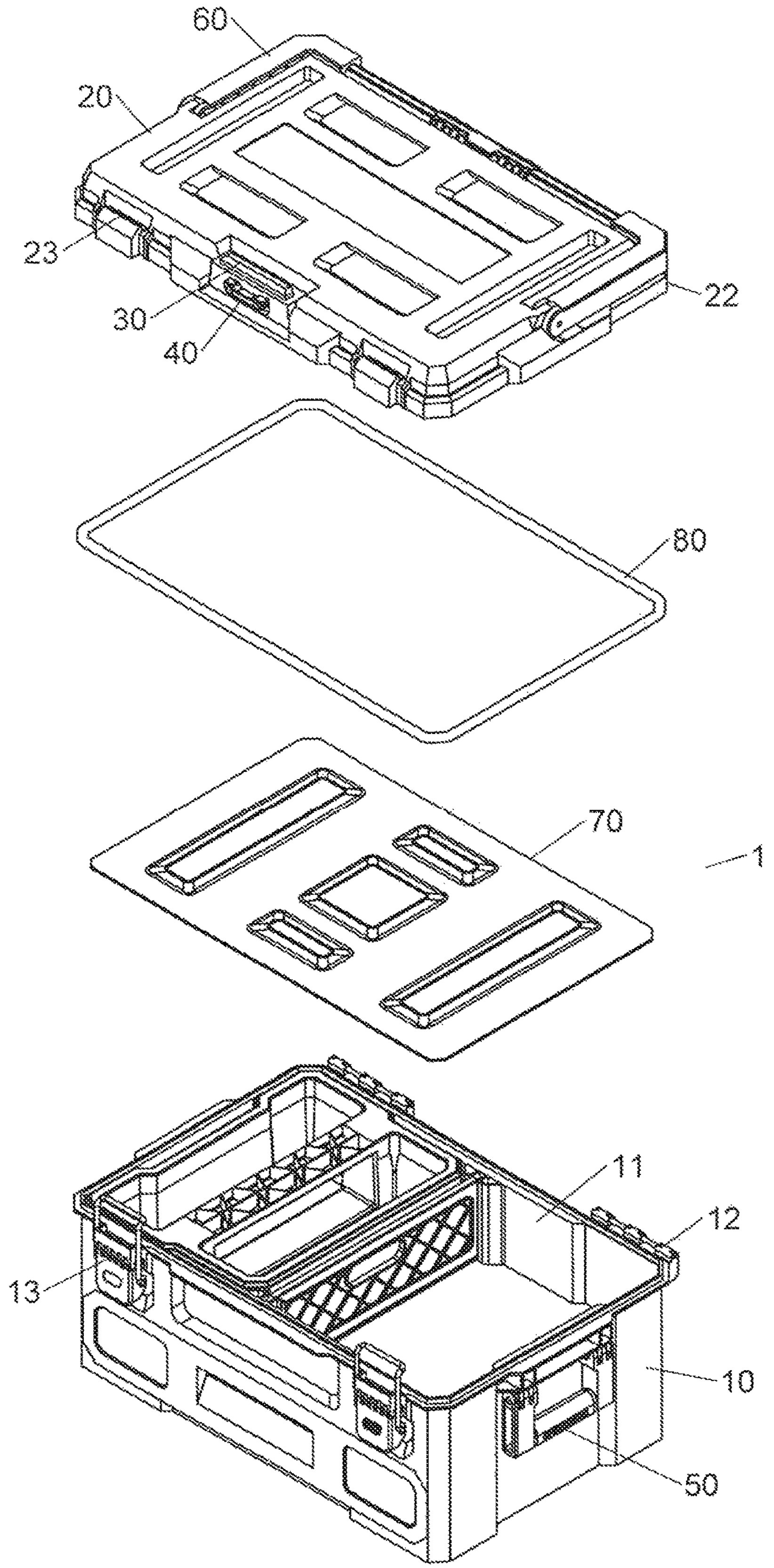
FIG. 1 is an exploded perspective view of one of multiple tool boxes of a tool box structure in accordance with the preferred embodiment of the present invention.

Referring to the drawings and initially to FIGS. 1-5, a tool box structure in accordance with the preferred embodiment of the present invention comprises multiple tool boxes 1. Each of the tool boxes 1 includes a first case (or shell) 10, a second case 20 (or shell), a first restriction unit 30, and a second restriction unit 40.

The first case 10 is a cuboid body. The first case 10 has an interior provided with a receiving space 11 for receiving hand tools or parts. The first case 10 has a first side provided with two first pivot portions 12. A determined distance is defined between the two first pivot portions 12. The first case 10 has a second side provided with two first snap-fit (or fastening or connecting) portions 13. A determined distance is defined between the two first snap-fit portions 13.

The first case 10 has a bottom provided with multiple first mounting portions 14. Each of the first mounting portions 14 is an elongate protruding block. The first case 10 includes four first mounting portions 14 which are evenly distributed on four corners of the bottom of the first case 10. Each of the first mounting portions 14 has a first side provided with a first locking portion 15. The first locking portion 15 is a projection. Each of the first mounting portions 14 has a second side provided with a first inclined face 16. Thus, each of the first mounting portions 14 has a substantially L-shaped cross-sectional profile.

The bottom of the first case 10 is provided with two second mounting portions 17 formed on two sides thereof. Each of the two second mounting portions 17 is an elongate protruding block. The two second mounting portions 17 are perpendicular to the first mounting portions 14 respectively.

The bottom of the first case 10 is provided with a limit portion 18. The limit portion 18 is an elongate protruding block. The bottom of the first case 10 is provided with multiple ribs 19. The ribs 19 are fully distributed over the bottom of the first case 10 to reinforce a strength of the first case 10.

The first case 10 is served as a lower layer of each of the tool boxes 1, and the second case 20 is served as an upper layer of each of the tool boxes 1. The second case 20 is pivotally connected with the first case 10. The second case 20 is pivoted relative to the first case 10 to open or close each of the tool boxes 1. The second case 20 has a first side provided with two second pivot portions 22 pivotally connected with the two first pivot portions 12. A determined distance is defined between the two second pivot portions 22. The second case 20 has a second side provided with two second snap-fit (or fastening or connecting) portions 23 detachably snapped (or locked) onto the two first snap-fit portions 13. A determined distance is defined between the two second snap-fit portions 23.

Figure 13:
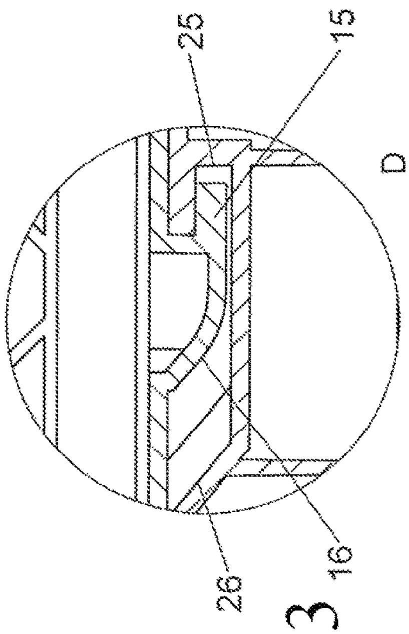
FIG. 13 is a locally enlarged view of assembly of the two tool boxes taken along circle D as shown in FIG. 12.

The second case 20 has a top provided with multiple third mounting portions 24 aligning with the first mounting portions 14. The third mounting portions 24 of the second case 20 of one of the tool boxes 1 are mounted on the first mounting portions 14 of the first case 10 of another one of the tool boxes 1. Each of the third mounting portions 24 has a first side provided with a second locking portion 25. The second locking portion 25 of the second case 20 of one of the tool boxes 1 is locked on the first locking portion 15 of the first case 10 of another one of the tool boxes 1 as shown in FIG. 13. Each of the third mounting portions 24 has a second side provided with a second inclined face 26. The first inclined face 16 of the first case 10 of one of the tool boxes 1 extends along the second inclined face 26 of the second case 20 of another one of the tool boxes 1, so that the first locking portion 15 of the first case 10 of one of the tool boxes 1 is smoothly inserted into and locked in the second locking portion 25 of the second case 20 of another one of the tool boxes 1 as shown in FIG. 13.

The top of the second case 20 is provided with two fourth mounting portions 27. Each of the two fourth mounting portions 27 is a slot. The two fourth mounting portions 27 of the second case 20 of one of the tool boxes 1 are mounted on the two second mounting portions 17 of the first case 10 of another one of the tool boxes 1.

Figure 9:
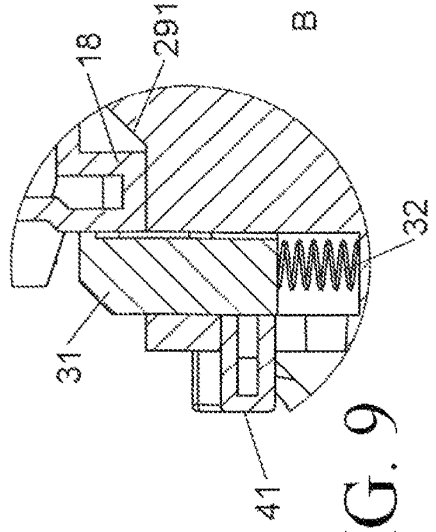
FIG. 9 is a locally enlarged view of assembly of the two tool boxes taken along circle B as shown in FIG. 8.
Figure 7:
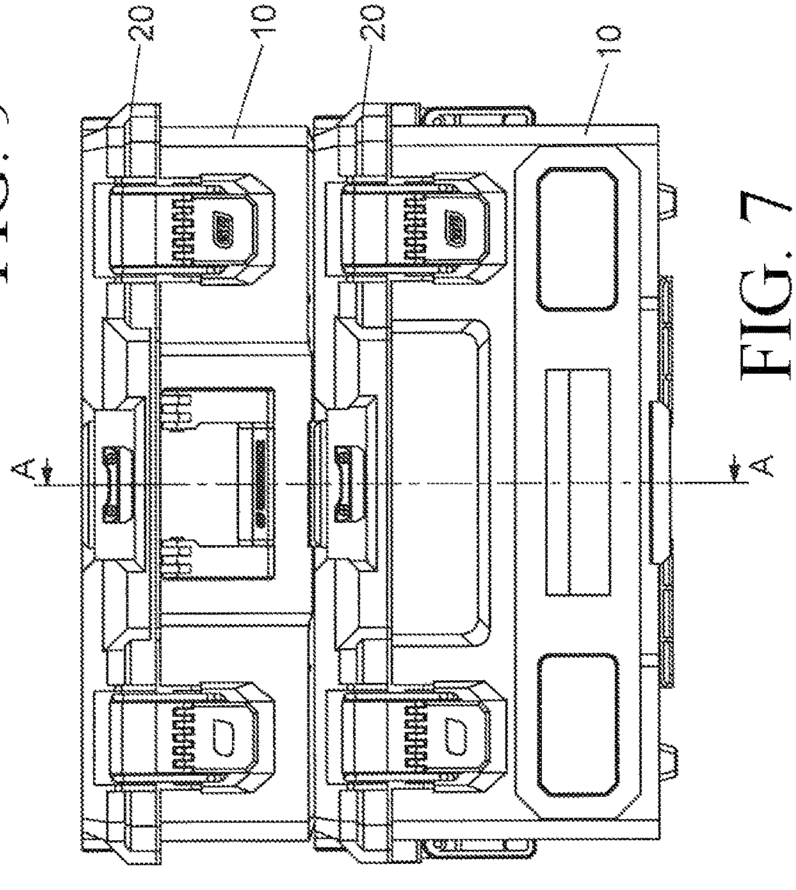
FIG. 7 is a front view showing assembly of the two tool boxes in accordance with the preferred embodiment of the present invention.

The second case 20 is provided with a first receiving groove 28. The first receiving groove 28 and the two second snap-fit portions 23 are located at the same side of the second case 20. The first receiving groove 28 is arranged between the two second snap-fit portions 23. The second case 20 is provided with a second receiving groove 29 located beside the first receiving groove 28. The second receiving groove 29 is perpendicular to the first receiving groove 28. The second receiving groove 29 is connected to the first receiving groove 28. The second receiving groove 29 has an opening directed toward a front of the second case 20. The second case 20 is provided with a third receiving groove 291 located beside the first receiving groove 28. The limit portion 18 of the first case 10 of one of the tool boxes 1 is received and limited in the third receiving groove 291 of the second case 20 of another one of the tool boxes 1 as shown in FIG. 9. The third receiving groove 291 is connected to the first receiving groove 28. The third receiving groove 291 is larger than the first receiving groove 28.

The first restriction unit 30 is mounted in the first receiving groove 28. The first restriction unit 30 is moved upward or downward in the first receiving groove 28 to restrict the limit portion 18, so that the first case 10 cannot be moved relative to the second case 20, or to release the limit portion 18, so that the first case 10 is moved relative to the second case 20. The first restriction unit 30 includes a restriction block 31, two elastic members 32, and two first threaded members 33.

The restriction block 31 is received in the first receiving groove 28 and partially protrudes from the first receiving groove 28 as shown in FIG. 9. The restriction block 31 restricts movement of the limit portion 18 as shown in FIG. 9. The restriction block 31 has a side provided with two fourth receiving grooves 311. A determined distance is defined between the two fourth receiving grooves 311. Each of the two fourth receiving grooves 311 is an L-shaped opening. The restriction block 31 is provided with two pillars 312 formed in the two fourth receiving grooves 311 respectively. The restriction block 31 is provided with two first through holes 313 located beside the two fourth receiving grooves 311 respectively. The restriction block 31 is provided with two hexagonal recesses 314 connected to the two first through holes 313 respectively. The two elastic members 32 are mounted on the two pillars 312 and biased between the second case 20 and the restriction block 31 to provide a restoring force to the restriction block 31. The two first threaded members 33 are received in the two hexagonal recesses 314 respectively. Preferably, each of the two first threaded members 33 is a nut.

The second restriction unit 40 is mounted in the second receiving groove 29. The second restriction unit 40 is assembled with the first restriction unit 30. When the second restriction unit 40 is driven, the first restriction unit 30 is driven and moved by the second restriction unit 40. The second restriction unit 40 includes a control block 41 and two second threaded members 42.

The control block 41 is received in the second receiving groove 29 and partially protrudes from the second receiving groove 29 as shown in FIG. 9. The control block 41 is slightly moved upward or downward in the second receiving groove 29. The control block 41 is provided with two second through holes 411. The two second through holes 411 align with the two through holes 313 respectively. The two second threaded members 42 respectively extend through the two second through holes 411 and the two through holes 313, and are screwed with the two first threaded members 33, so that the control block 41 is combined with the restriction block 31. The control block 41 and the restriction block 31 are limited in the second receiving groove 29 and the first receiving groove 28 respectively as shown in FIG. 9. The control block 41 drives and moves the restriction block 31. Preferably, each of the two second threaded members 42 is a screw.

Figure 10:
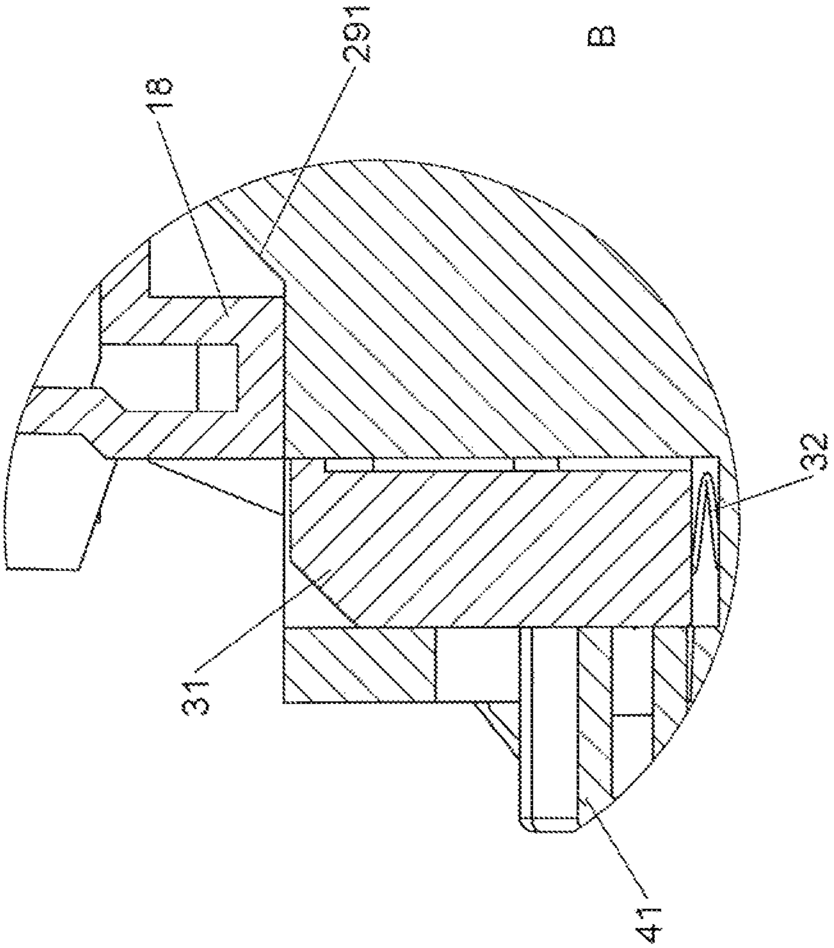
FIG. 10 is a schematic operational view of assembly of the two tool boxes as shown in FIG. 9.

When the second restriction unit 40 is driven or pressed, the second restriction unit 40 drives the first restriction unit 30 to move downward, so that the first restriction unit 30 is controlled and retracted into the first receiving groove 28 as shown in FIG. 10. Thus, the limit portion 18 is released from the first restriction unit 30, and the first case 10 is moved relative to the second case 20, so that the first locking portion 15 is unlocked from the second locking portion 25, and the first inclined face 16 is moved smoothly along the second inclined face 26. In such a manner, the first case 10 is moved upward and detached from the second case 20.

Each of the tool boxes 1 further includes two first handles 50 pivotally mounted on two sides of the first case 10 to facilitate the user holding the first case 10.

Each of the tool boxes 1 further includes a second handle 60 pivotally mounted on the second case 20 to facilitate the user holding the second case 20.

Each of the tool boxes 1 further includes a separation piece (or plate) 70 received in an opening of the receiving space 11 to close the receiving space 11.

Each of the tool boxes 1 further includes a sealing strip (or gasket or loop) 80 mounted on a periphery of the first case 10 and a periphery of the second case 20 to seal each of the tool boxes 1 when the first case 10 and the second case 20 are covered and closed.

In assembly, referring to FIGS. 6-9 with reference to FIGS. 1-5, two of the tool boxes 1 are assembled. The limit portion 18 of the first case 10 of an upper one of the tool boxes 1 is stopped and limited by the restriction block 31 of the first restriction unit 30 of a lower one of the tool boxes 1, so that the limit portion 18 of the first case 10 of the upper one of the tool boxes 1 is retained in the third receiving groove 291 of the second case 20 of the lower one of the tool boxes 1 as shown in FIG. 9. At this time, the two second mounting portions 17 of the first case 10 of the upper one of the tool boxes 1 are mounted in the two fourth mounting portions 27 of the second case 20 of the lower one of the tool boxes 1, so that the upper one of the tool boxes 1 is fixed and cannot be moved relative to the lower one of the tool boxes 1.

In operation, referring to FIG. 10 with reference to FIGS. 1-9, when the second restriction unit 40 is pressed, the second restriction unit 40 drives the first restriction unit 30 to move downward, so that the first restriction unit 30 is retracted into the first receiving groove 28, and the two elastic members 32 are compressed. In such a manner, the limit portion 18 of the first case 10 of the upper one of the tool boxes 1 is released from the first restriction unit 30 of the lower one of the tool boxes 1, and the first case 10 of the upper one of the tool boxes 1 is moved upward and detached from the second case 20 of the lower one of the tool boxes 1. At this time, when the first case 10 of the upper one of the tool boxes 1 is moved relative to the second case 20 of the lower one of the tool boxes 1, the first locking portion 15 of the upper one of the tool boxes 1 is unlocked from the second locking portion 25 of the lower one of the tool boxes 1, and the first inclined face 16 of the upper one of the tool boxes 1 is moved smoothly along the second inclined face 26 of the lower one of the tool boxes 1. Thus, the first case 10 of the upper one of the tool boxes 1 is moved upward and detached from the second case 20 of the lower one of the tool boxes 1.

Figure 12:
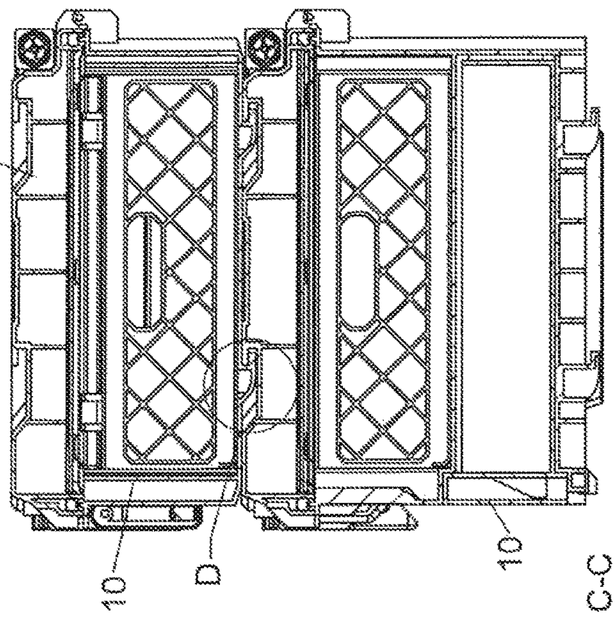
FIG. 12 is a cross-sectional view of assembly of the two tool boxes taken along line C-C as shown in FIG. 11.
Figure 11:
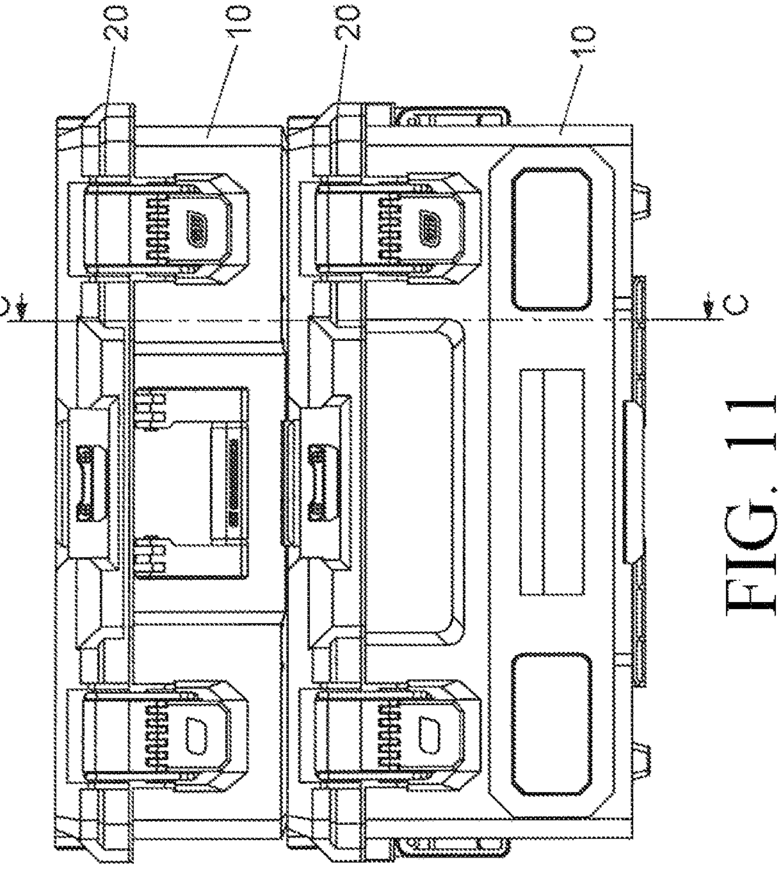
FIG. 11 is a front view showing assembly of the two tool boxes in accordance with the preferred embodiment of the present invention.

Now, referring to FIGS. 11-13 with reference to FIGS. 1-9, two of the tool boxes 1 are assembled and stacked. When the first mounting portions 14 of the first case 10 of the upper one of the tool boxes 1 are mounted in the third mounting portions 24 of the second case 20 of the lower one of the tool boxes 1, the first locking portion 15 of the first case 10 of the upper one of the tool boxes 1 is received and locked in the second locking portion 25 of the second case 20 of the lower one of the tool boxes 1 as shown in FIG. 13. Thus, the upper one of the tool boxes 1 is locked onto and cannot be detached from the lower one of the tool boxes 1. When the first locking portion 15 of the first case 10 of the upper one of the tool boxes 1 is moved forward or backward in the second locking portion 25 of the second case 20 of the lower one of the tool boxes 1, the first inclined face 16 of the first case 10 of the upper one of the tool boxes 1 is guided by the second inclined face 26 of the second case 20 of the lower one of the tool boxes 1, so that the first locking portion 15 of the first case 10 of the upper one of the tool boxes 1 is smoothly inserted into and locked in the second locking portion 25 of the second case 20 of the lower one of the tool boxes 1.

Figure 14:
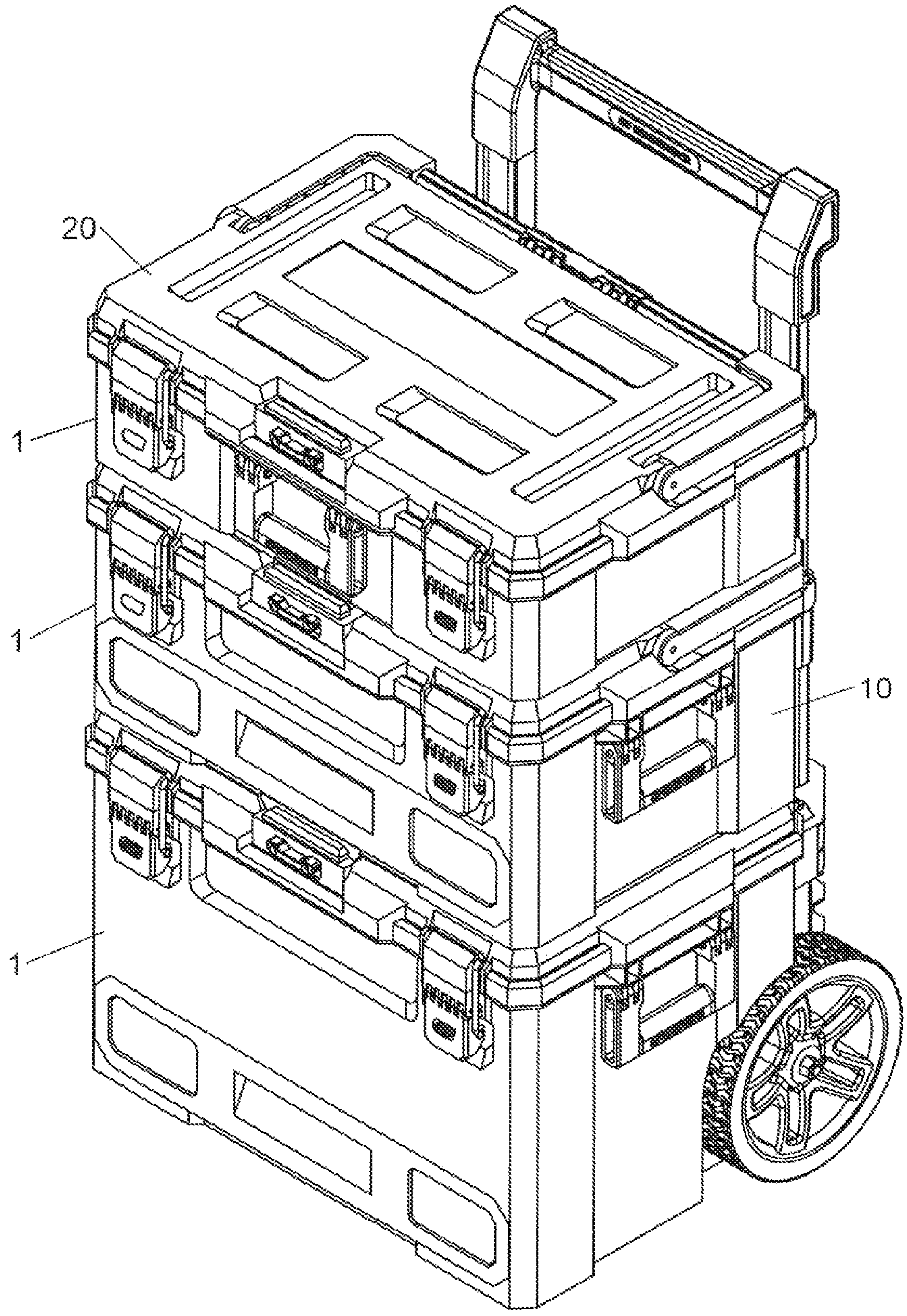
FIG. 14 is a perspective view of the tool box structure in accordance with the preferred embodiment of the present invention.

Referring to FIG. 14, the tool boxes 1 are assembled and stacked. A lowermost one of the tool boxes 1 is provided with two wheels and a pull handgrip. Thus, the tool boxes 1 are combined to function as a handcart to facilitate the user moving and carrying the tool box structure.

Accordingly, the tool box structure of the present invention has the following advantages.

1. The limit portion 18 of the first case 10 of one of the tool boxes 1 is received and limited in the third receiving groove 291 of the second case 20 of another one of the tool boxes 1 as shown in FIG. 9. The first restriction unit 30 and the second restriction unit 40 are limited in the first receiving groove 28 and the second receiving groove 29 respectively. Thus, the second restriction unit 40 drives the first restriction unit 30 to lock or unlock the limit portion 18.

2. Each of the tool boxes 1 is provided with the first restriction unit 30 and the second restriction unit 40. Thus, the two first snap-fit portions 13 and the two second snap-fit portions 23 have various structures so that each of the tool boxes 1 has a modularized feature.

3. The first mounting portions 14 are mounted in the third mounting portions 24, the first locking portion 15 is locked in the second locking portion 25, the two second mounting portions 17 are mounted in the two fourth mounting portions 27, and the limit portion 18 is received in the third receiving groove 291 and limited by the first restriction unit 30, so that each of the tool boxes 1 has four locking positions. Thus, the tool boxes 1 are assembled exactly and will not be detached or slip easily.

4. The first locking portion 15 is locked in the second locking portion 25, and the first inclined face 16 is guided by the second inclined face 26, so that when the tool boxes 1 are stacked together, the tool boxes 1 are locked or unlocked smoothly.

Figure 2:
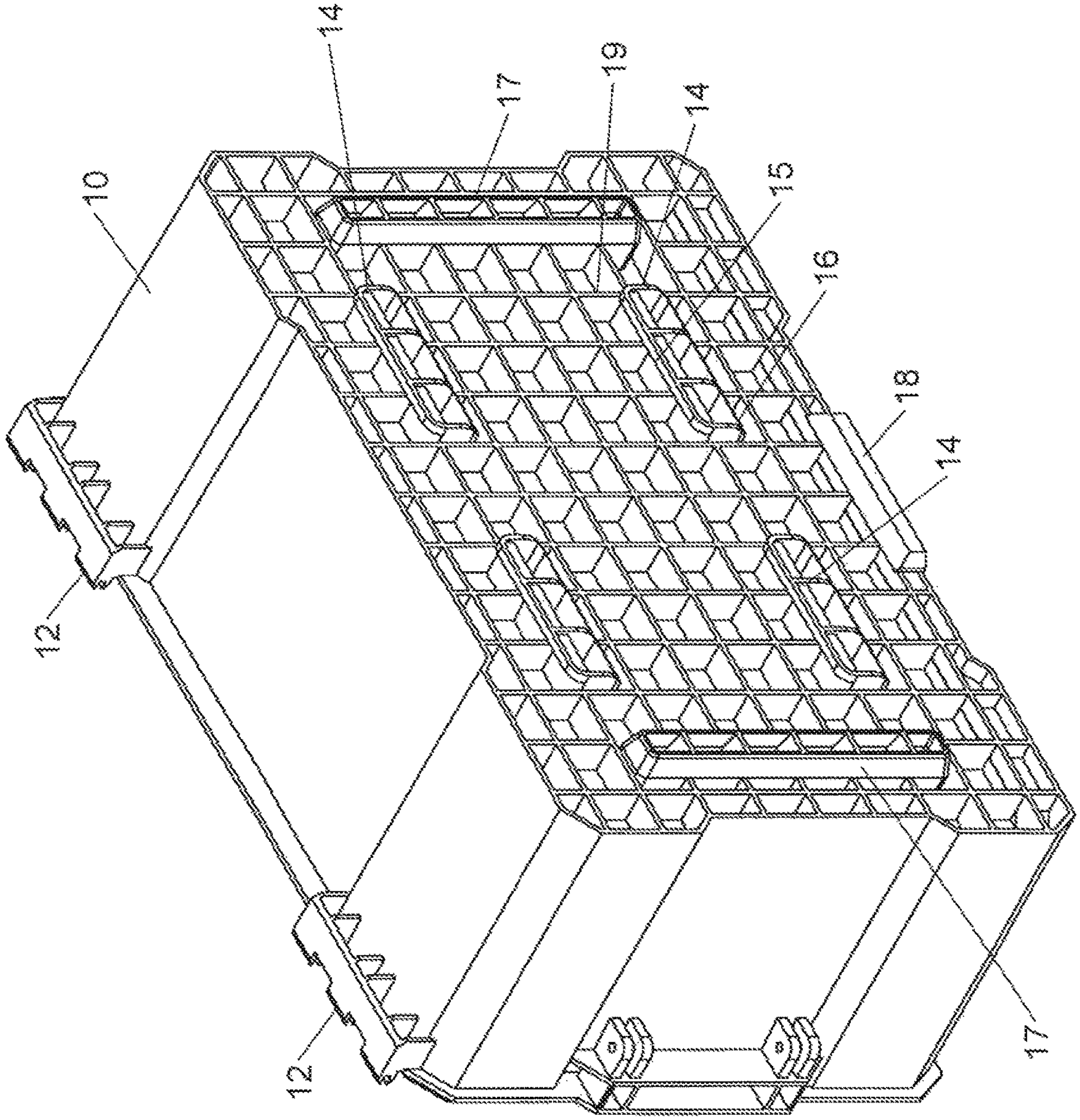
FIG. 2 is a perspective view of a first case of the tool box in accordance with the preferred embodiment of the present invention.
Figure 4:
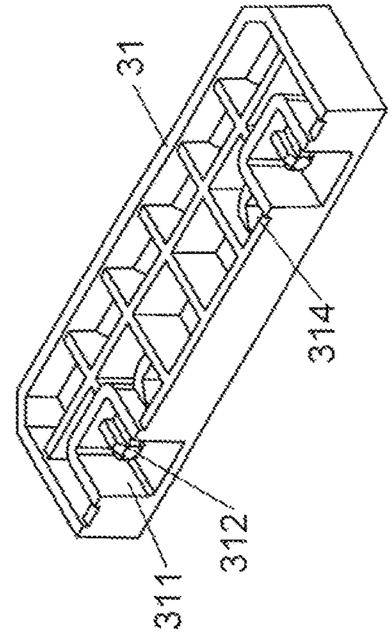
FIG. 4 is a perspective view of a restriction block of the tool box in accordance with the preferred embodiment of the present invention.
Figure 3:
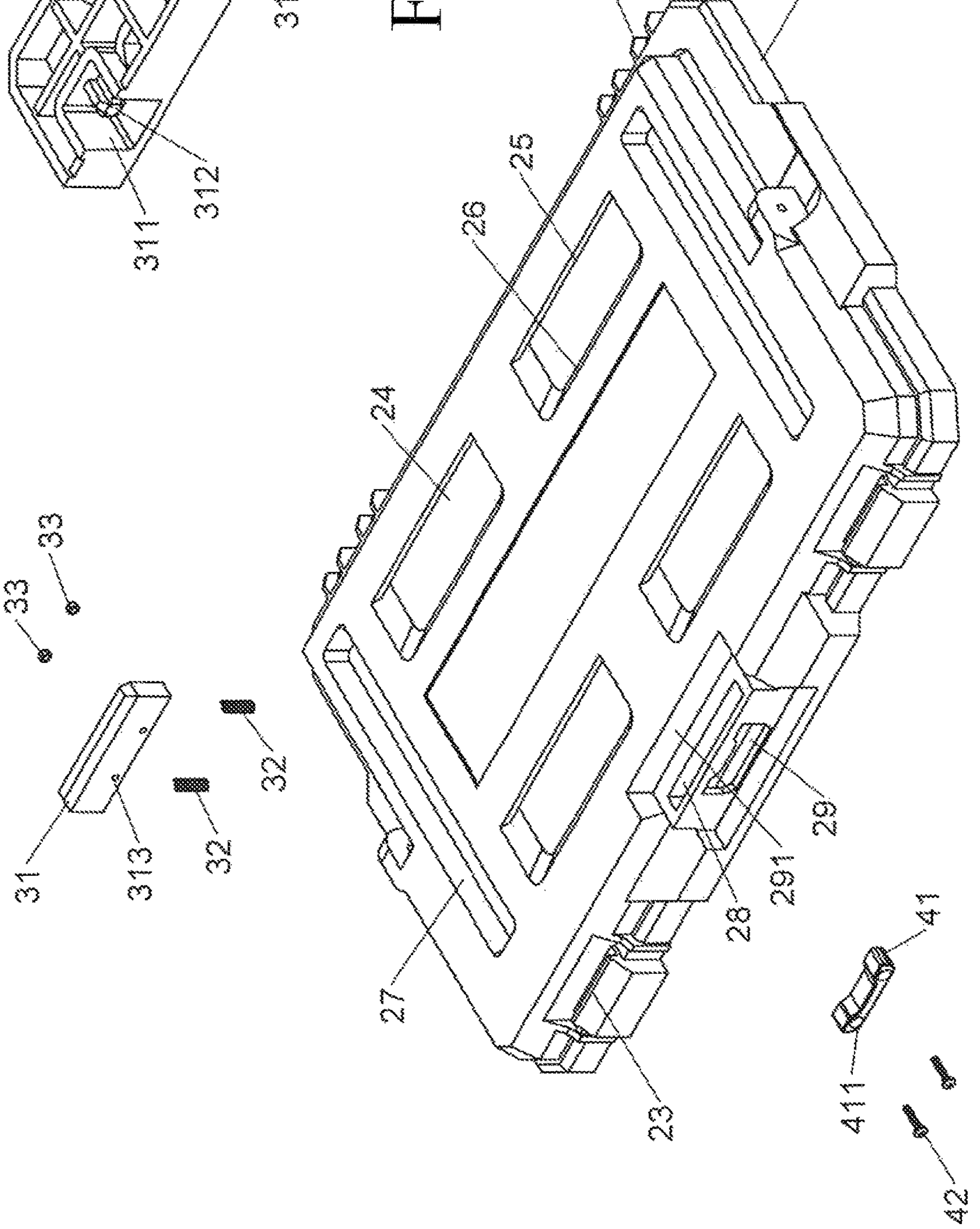
FIG. 3 is a partial exploded perspective view of the tool box in accordance with the preferred embodiment of the present invention.
Figure 5:
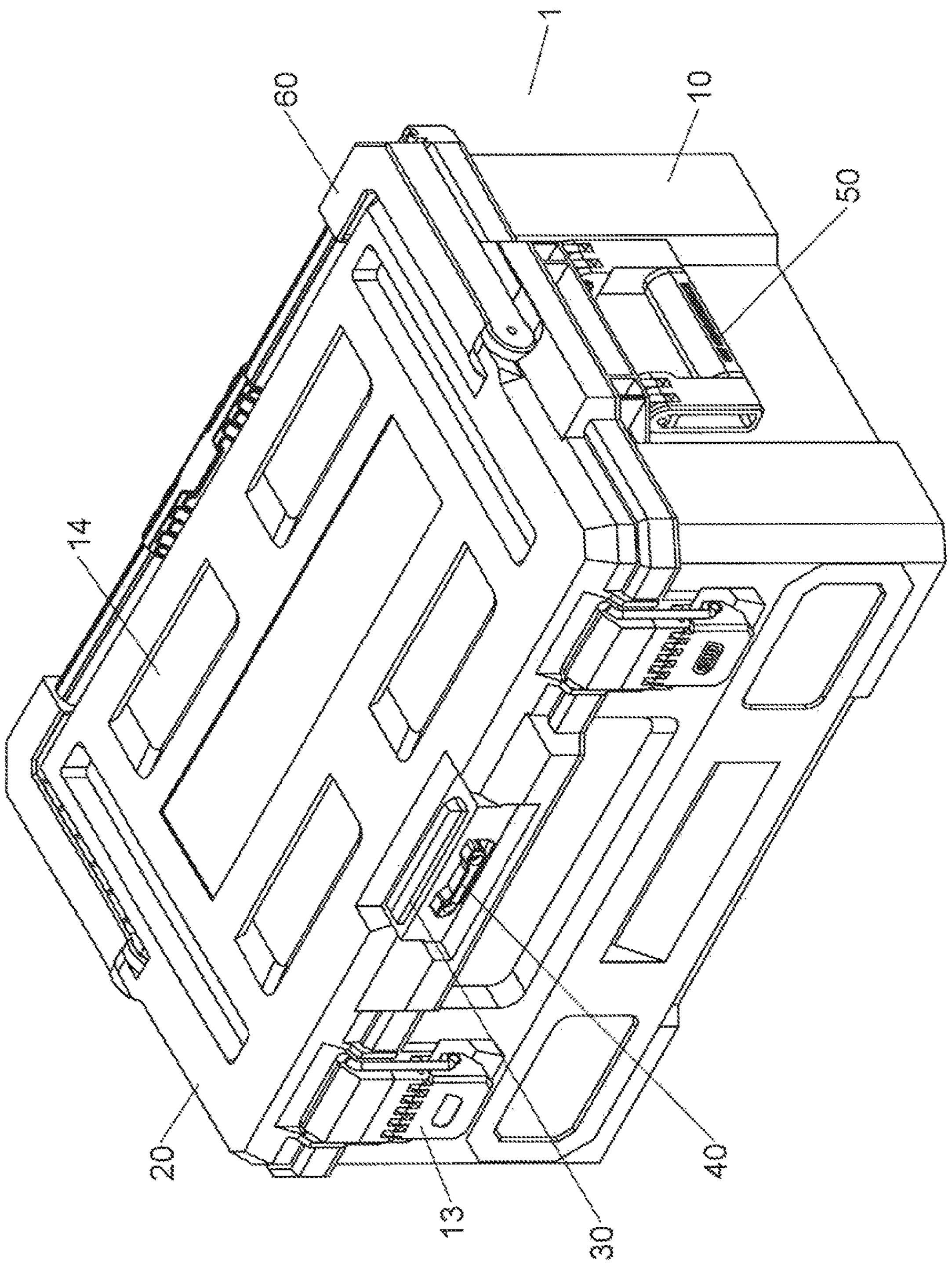
FIG. 5 is a perspective view of the tool box in accordance with the preferred embodiment of the present invention.
Figure 6:
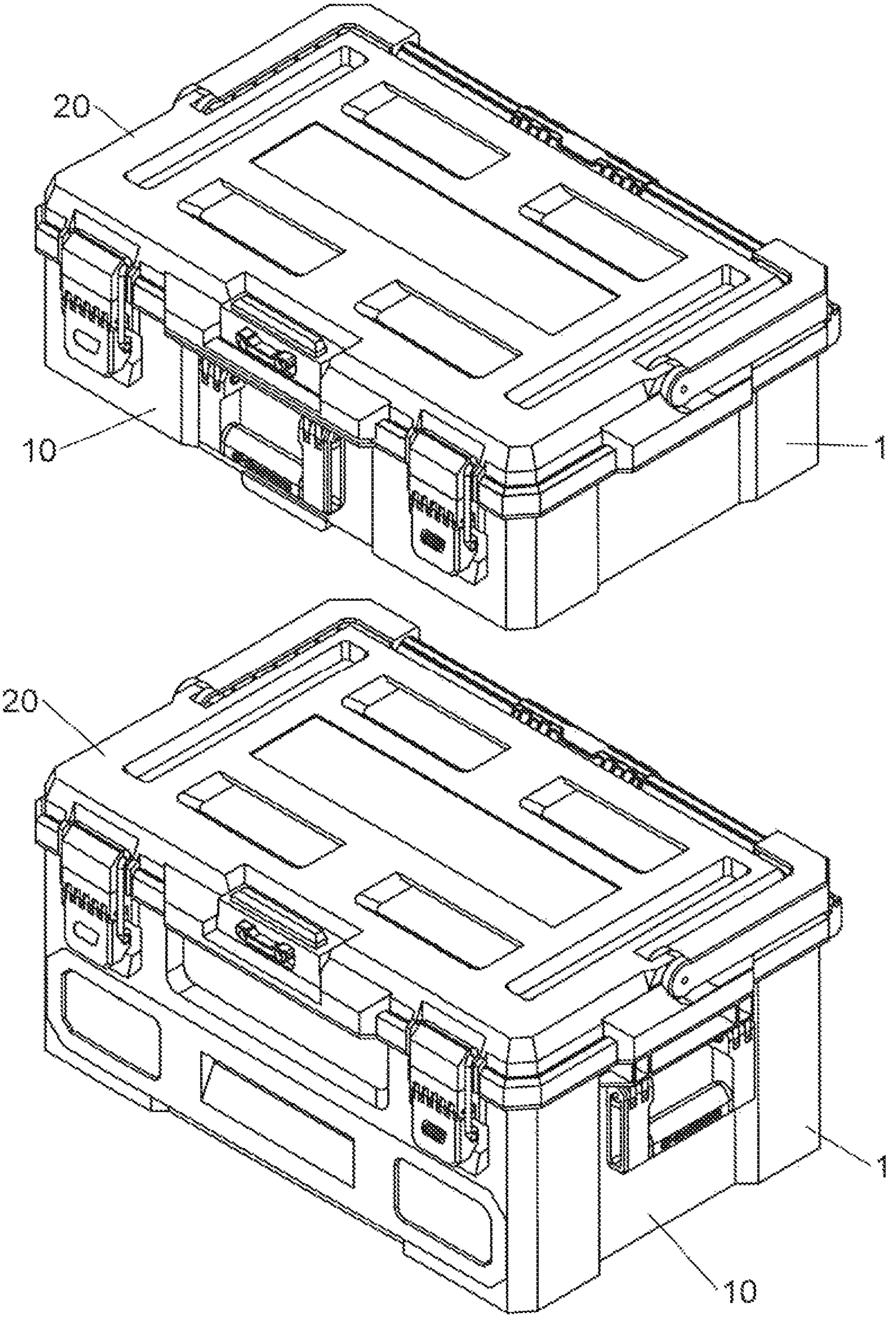
FIG. 6 is a perspective view showing two of the tool boxes of a tool box structure in accordance with the preferred embodiment of the present invention.
Figure 8:
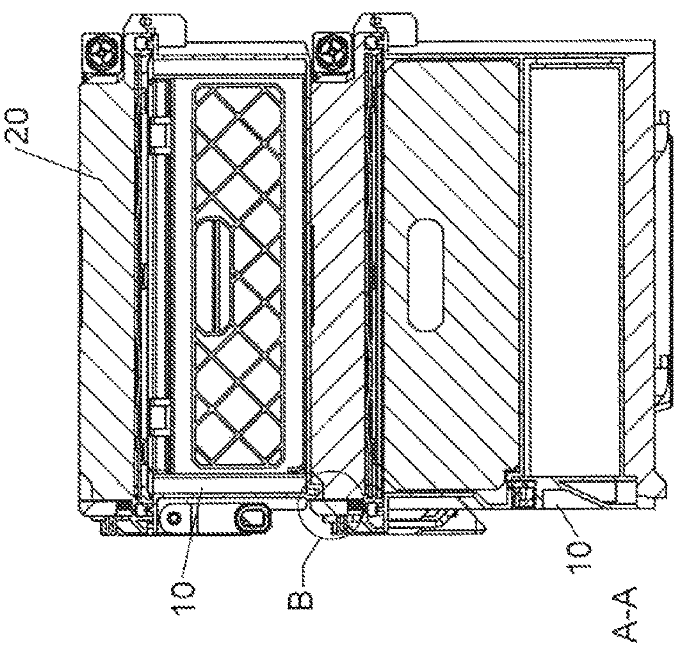
FIG. 8 is a cross-sectional view of assembly of the two tool boxes taken along line A-A as shown in FIG. 7.

5. Referring to FIG. 2. the two second mounting portions 17 are perpendicular to the first mounting portions 14 respectively, so that when an external force in any direction is applied on the first case 10 and the second case 20, the two second mounting portions 17 and the first mounting portions 14 construct a steady and solid structure to withstand the external force exactly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A tool box structure comprising:

multiple tool boxes;

wherein:

each of the tool boxes includes a first case, a second case, a first restriction unit, and a second restriction unit;

the first case is a cuboid body;

the first case has an interior provided with a receiving space;

the first case has a bottom provided with multiple first mounting portions;

each of the first mounting portions is an elongate protruding block;

each of the first mounting portions has a first side provided with a first locking portion;

the first locking portion is a projection;

each of the first mounting portions has a second side provided with a first inclined face;
each of the first mounting portions has a substantially L-shaped cross-sectional profile;
the bottom of the first case is provided with two second mounting portions formed on two sides thereof;
each of the two second mounting portions is an elongate protruding block;
the two second mounting portions are perpendicular to the first mounting portions respectively;
the bottom of the first case is provided with a limit portion;
the limit portion is an elongate protruding block;
the first case is served as a lower layer of each of the tool boxes, and the second case is served as an upper layer of each of the tool boxes;
the second case is pivotally connected with the first case;
the second case is pivoted relative to the first case to open or close each of the tool boxes;
the second case has a top provided with multiple third mounting portions aligning with the first mounting portions;
the third mounting portions of the second case of one of the tool boxes are mounted on the first mounting portions of the first case of another one of the tool boxes;
each of the third mounting portions has a first side provided with a second locking portion;
the second locking portion of the second case of one of the tool boxes is locked on the first locking portion of the first case of another one of the tool boxes;
each of the third mounting portions has a second side provided with a second inclined face;
the first inclined face of the first case of one of the tool boxes extends along the second inclined face of the second case of another one of the tool boxes, so that the first locking portion of the first case of one of the tool boxes is smoothly locked in the second locking portion of the second case of another one of the tool boxes;
the top of the second case is provided with two fourth mounting portions;
each of the two fourth mounting portions is a slot;
the two fourth mounting portions of the second case of one of the tool boxes are mounted on the two second mounting portions of the first case of another one of the tool boxes;
the second case is provided with a first receiving groove;
the second case is provided with a second receiving groove located beside the first receiving groove;
the second receiving groove is perpendicular to the first receiving groove;
the second receiving groove is connected to the first receiving groove;
the second receiving groove has an opening directed toward a front of the second case;
the second case is provided with a third receiving groove located beside the first receiving groove;
the limit portion of the first case of one of the tool boxes is received and limited in the third receiving groove of the second case of another one of the tool boxes;
the third receiving groove is connected to the first receiving groove;
the third receiving groove is larger than the first receiving groove;
the first restriction unit is mounted in the first receiving groove;

the first restriction unit is moved upward or downward in the first receiving groove to restrict the limit portion, so that the first case cannot be moved relative to the second case, or to release the limit portion, so that the first case is moved relative to the second case;
the first restriction unit includes a restriction block, two elastic members, and two first threaded members;
the restriction block is received in the first receiving groove and partially protrudes from the first receiving groove;
the restriction block restricts movement of the limit portion;
the restriction block has a side provided with two fourth receiving grooves;
the restriction block is provided with two pillars formed in the two fourth receiving grooves respectively;
the restriction block is provided with two first through holes located beside the two fourth receiving grooves respectively;
the restriction block is provided with two hexagonal recesses connected to the two first through holes respectively;
the two elastic members are mounted on the two pillars to provide a restoring force to the restriction block;
the two first threaded members are received in the two hexagonal recesses respectively;
the second restriction unit is mounted in the second receiving groove;
the second restriction unit is assembled with the first restriction unit;
when the second restriction unit is driven, the first restriction unit is driven and moved by the second restriction unit;
the second restriction unit includes a control block and two second threaded members;
the control block is received in the second receiving groove and partially protrudes from the second receiving groove;
the control block is slightly moved upward or downward in the second receiving groove;
the control block is provided with two second through holes;
the two second through holes align with the two through holes respectively;
the two second threaded members respectively extend through the two second through holes and the two through holes, and are screwed with the two first threaded members, so that the control block is combined with the restriction block;
the control block and the restriction block are limited in the second receiving groove and the first receiving groove respectively;
the control block drives and moves the restriction block;
when the second restriction unit is driven or pressed, the second restriction unit drives the first restriction unit to move downward, so that the first restriction unit is retracted into the first receiving groove; the limit portion is released from the first restriction unit, and the first case is moved relative to the second case, so that the first locking portion is unlocked from the second locking portion, and the first inclined face is moved along the second inclined face; and
the first case is moved upward and detached from the second case.

2. The tool box structure as claimed in claim 1, wherein:
the first case has a first side provided with two first pivot portions;

a determined distance is defined between the two first pivot portions;

the first case has a second side provided with two first snap-fit portions;

a determined distance is defined between the two first snap-fit portions;

the second case has a first side provided with two second pivot portions pivotally connected with the two first pivot portions;

a determined distance is defined between the two second pivot portions;

the second case has a second side provided with two second snap-fit portions detachably snapped onto the two first snap-fit portions;

the first receiving groove and the two second snap-fit portions are located at the same side of the second case; and the first receiving groove is arranged between the two second snap-fit portions.

3. The tool box structure as claimed in claim 1, wherein the first case includes four first mounting portions which are evenly distributed on four corners of the bottom of the first case.

4. The tool box structure as claimed in claim 1, wherein the bottom of the first case is provided with multiple ribs, and the ribs are fully distributed over the bottom of the first case to reinforce a strength of the first case 10.

5. The tool box structure as claimed in claim 1, wherein a determined distance is defined between the two fourth receiving grooves, and each of the two fourth receiving grooves is an L-shaped opening.

6. The tool box structure as claimed in claim 1, wherein each of the tool boxes further includes two first handles pivotally mounted on two sides of the first case.

7. The tool box structure as claimed in claim 1, wherein each of the tool boxes further includes a second handle pivotally mounted on the second case.

8. The tool box structure as claimed in claim 1, wherein each of the tool boxes further includes a separation piece received in an opening of the receiving space to close the receiving space.

9. The tool box structure as claimed in claim 1, wherein each of the tool boxes further includes a sealing strip mounted on a periphery of the first case and a periphery of the second case to seal each of the tool boxes when the first case and the second case are closed.

10. The tool box structure as claimed in claim 1, wherein:

the tool boxes are assembled and stacked;

a lowermost one of the tool boxes is provided with two wheels and a pull handgrip; and the tool boxes are combined to function as a handcart.

* * * * *